United States Patent [19]

Inoue et al.

[11] Patent Number: 5,206,808
[45] Date of Patent: Apr. 27, 1993

[54] VEHICLE TURNING BEHAVIOR CONTROL APPARATUS

[75] Inventors: Hideaki Inoue; Hirotsugu Yamaguchi; Sunao Hano; Shinji Matsumoto; Jun Kubo, all of Kanagawa, Japan

[73] Assignee: Nissan Motor Company, Limited, Yokohama, Japan

[21] Appl. No.: 673,298

[22] Filed: Mar. 22, 1991

[30] Foreign Application Priority Data

Mar. 27, 1990 [JP] Japan .................................. 2-75616

[51] Int. Cl.⁵ .................................. B60T 8/26
[52] U.S. Cl. .......................... 364/424.05; 364/426.01; 364/426.03; 303/100
[58] Field of Search ........... 364/420.01, 426.03, 364/424.05; 180/197; 303/100, 102

[56] References Cited

U.S. PATENT DOCUMENTS

| | | | |
|---|---|---|---|
| 4,484,280 | 11/1984 | Brugger et al. | 364/426.03 |
| 4,758,053 | 7/1988 | Yasuno . | |
| 4,873,639 | 10/1989 | Sato et al. | 364/426.02 |
| 4,884,651 | 12/1989 | Harada et al. | 180/197 |
| 4,998,782 | 3/1991 | Thatcher et al. | 303/110 |
| 5,083,631 | 1/1992 | Nakayama et al. | 180/197 |
| 5,102,203 | 4/1992 | Tierney | 303/93 |

FOREIGN PATENT DOCUMENTS

2112669 10/1972 Fed. Rep. of Germany .
3731756 3/1989 Fed. Rep. of Germany .

*Primary Examiner*—Thomas G. Black
*Attorney, Agent, or Firm*—Foley & Lardner

[57] ABSTRACT

A vehicle turning behavior control apparatus for use with a multi-wheel automatic vehicle. The apparatus provides a difference between the braking forces applied to the nearside and offside wheels of the vehicle to produce a yaw moment in a direction to which the vehicle turns. The difference is determined based upon the vehicle steering angle and is modified based upon the vehicle lateral slip angle.

8 Claims, 6 Drawing Sheets

VEHICLE TURNING BEHAVIOR CONTROL APPARATUS

BACKGROUND OF THE INVENTION

This invention relates to an apparatus for controlling the behavior of a multi-wheeled automotive vehicle turning either to the left or to the right and, more particularly, to such a vehicle turning behavior control apparatus for providing different braking forces to the offside and nearside wheels of the vehicle.

For example, Japanese Utility Model Kokai No. 59-155264 discloses an anti-skid braking apparatus arranged to improve the initial vehicle heading performance by delaying the time at which brakes are applied to the offside wheels of the vehicle so as to produce a yaw moment in a direction correcting an understeer characteristic when the vehicle steering angle exceeds a predetermined value. With such an anti-skid braking apparatus, however, the difference between the braking forces applied to the offside and nearside wheels depends on the vehicle lateral slip angle. At great vehicle lateral slip angles, the vehicle will turn to an excessive degree.

SUMMARY OF THE INVENTION

Therefore, it is a main object of the invention to provide a vehicle turning behavior control apparatus which can correct the difference between the braking forces applied to the offside and nearside wheels of the vehicle based upon the vehicle lateral slip angle so as to provide an improved vehicle turning behavior.

There is provided, in accordance with the invention, an apparatus for controlling turning behavior of a multi-wheeled automotive vehicle supported on a plurality of pairs of wheels. The apparatus comprises braking means for applying braking forces to the respective wheels, first sensor means sensitive to a vehicle steering condition for producing a first signal indicative of a sensed vehicle steering condition, second sensor means sensitive to a vehicle lateral slip angle for producing a second signal indicative of a sensed vehicle lateral slip angle, and a control unit coupled to the first and second sensor means. The control unit includes means for providing a difference between the braking forces applied to nearside and offside wheels of at least one of the pairs of wheels based upon the sensed vehicle steering condition to produce a yaw moment in a direction to which the vehicle turns, and means for modifying the difference based upon the sensed vehicle lateral slip angle to decrease the difference as the vehicle lateral slip angle increases.

In another aspect of the invention, the vehicle turning behavior control apparatus comprises braking means for applying braking forces to the respective wheels, first sensor means sensitive to a vehicle steering angle for producing a first signal indicative of a sensed vehicle steering angle, second sensor means sensitive to a vehicle lateral slip angle for producing a second signal indicative of a sensed vehicle lateral slip angle, and a control unit coupled to the first and second sensor means. The control unit includes means for calculating a basic value $\Delta P1$ as a function of the sensed vehicle steering angle to increase the basic value as the sensed vehicle steering angle increases when the sensed vehicle steering angle exceeds a predetermined value, means for calculating a first correction factor K1 as a function of the sensed vehicle lateral slip angle to decrease the first correction factor as the sensed vehicle lateral slip increases, means for calculating a difference $\Delta P$ as $\Delta P = \Delta P1 \times K1$, and means for setting the braking means to provide the calculated difference $\Delta P$ between the braking forces applied to nearside and offside wheels of at least one of the pairs of wheels so that the braking force applied to the offside wheel is smaller than the braking force applied to the nearside wheel.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
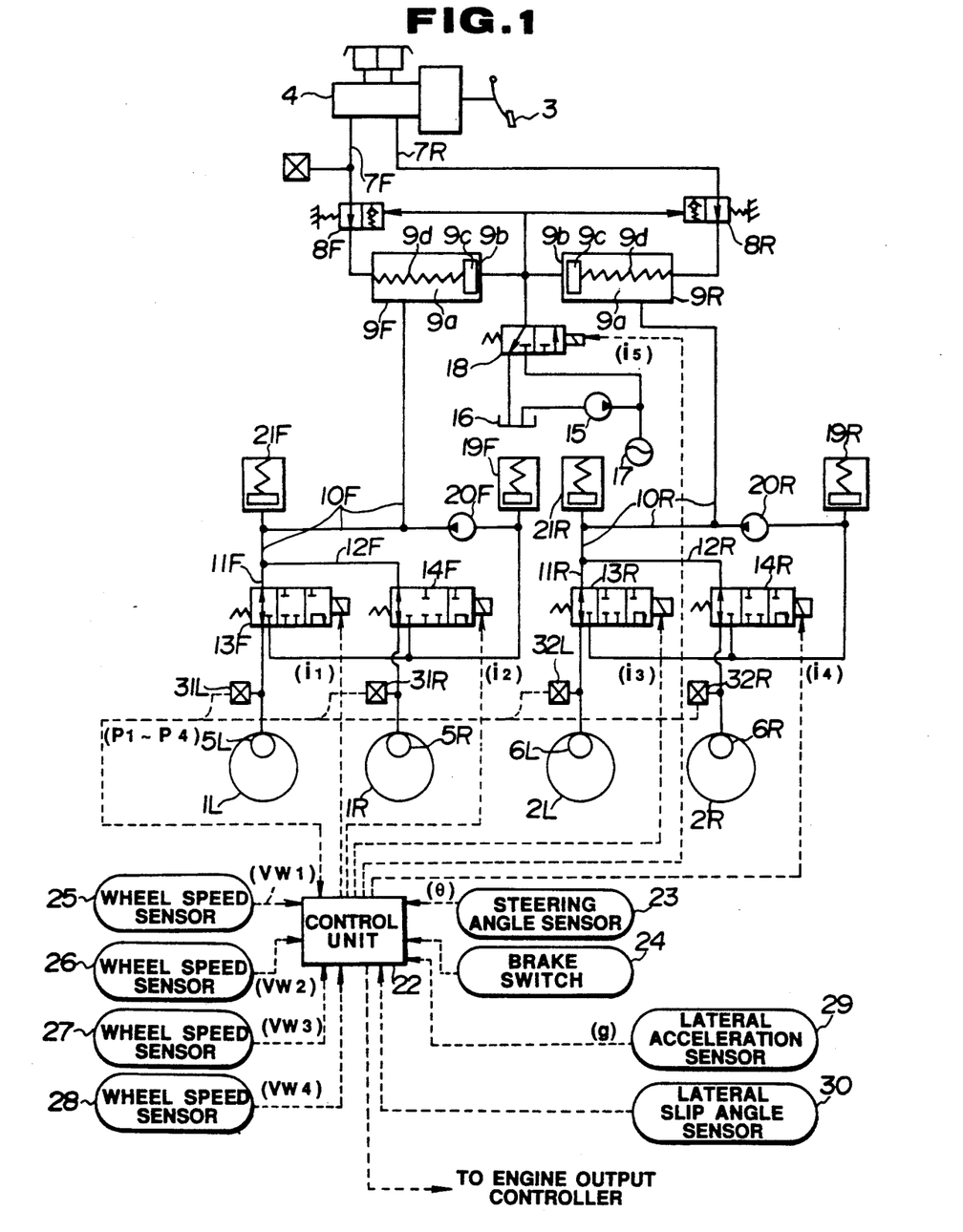
FIG. 1 is a schematic diagram of a vehicle turning behavior control apparatus embodying the invention.

With reference to the drawings, and in particular to FIG. 1, there is shown a schematic diagram of a vehicle turning behavior control apparatus embodying the invention. The invention will be described in connection with an automotive vehicle supported on a pair of front wheels 1L and 1R spaced laterally apart at equal distances from a vehicle longitudinal axis and a pair of rear wheels 2L and 2R spaced laterally apart at equal distances from the vehicle longitudinal axis. The numeral 3 designates a brake pedal which actuates the pistons in a tandem master cylinder 4 and forces fluid through a first hydraulic system to wheel cylinders 5L and 5R situated in front wheel brakes for application of brakes to the respective front wheels 1L and 1R and also through a second hydraulic system to wheel cylinders 6L and 6R situated in rear wheel brakes for application of brakes to the respective rear wheels 2L and 2R.

The first hydraulic system includes a pressure responsive change-over valve 8F which has an inlet connected through a conduit 7F to the master cylinder 4 and an outlet connected through a pilot cylinder 9F to a conduit 10F. The change-over valve 8F normally occupies in a first position, illustrated in FIG. 1, to provide communication between the master cylinder 4 and the pilot cylinder 9F. The change-over valve 8F responds to a fluid pressure by changing to a second position permitting fluid flow from the master cylinder 4 to the pilot cylinder 9F but not vice versa. The pilot cylinder 9F includes a piston 9c provided for reciprocating movement within the pilot cylinder valve bore to define output and input chambers 9a and 9b on the opposite sides of the piston 9c. The piston 9c is urged toward the illustrated first position by means of a compression spring 9d placed within the pilot cylinder valve bore.

When the input chamber 9b receives a fluid pressure, the piston 9c moves against the resilient force of the compression spring 9d to force fluid from the output chamber 9a to the conduit 10F. The conduit 10F is divided into two conduits 11F and 12F, the first conduit 11F being connected through a pressure control valve 13F to the wheel cylinder 5L provided for the left front wheel 1L. The second conduit 12F is connected through another pressure control valve 14F to the wheel cylinder 5R provided for the right front wheel 1R. A pump 20F is provided to supply fluid from a reservoir 19F to the conduit 10F when it is running and an accumulator 21F is charged up the fluid flow through the conduit 10F. The pressure control valve 13F operates on a current signal i1 fed thereto to occupy one of three positions. The first position, illustrated in FIG. 1, is occupied when the current signal i1 has a level of zero amperes and the pressure control valve 13F provides communication of the conduit 11F with the wheel cylinder 5L provided for the left front wheel 1L so as to increase the fluid pressure introduced to the wheel cylinder 5L. The second position is encountered when the current signal i1 has a level of two amperes and the pressure control valve 13F interrupts the communication between the conduit 11F and the wheel cylinder 5L so as to retain the fluid pressure in the wheel cylinder 5L. The third position is encountered when the current signal i1 has a level of five amperes and the pressure control valve 13F provides communication between the wheel cylinder 5L and the reservoir 19F so as to reduce the fluid pressure in the wheel cylinder 5L. The pressure control valve 14F operates on a current signal i2 fed thereto to occupy one of three positions. The first position, illustrated in FIG. 1, is occupied when the current signal i2 has a level of zero amperes and the pressure control valve 14F provides communication of the conduit 11F with the wheel cylinder 5R provided for the right front wheel 1R so as to increase the fluid pressure introduced to the wheel cylinder 5R. The second position is encountered when the current signal i2 has a level of two amperes and the pressure control valve 14F interrupts the communication between the conduit 11F and the wheel cylinder 5R so as to retain the fluid pressure in the wheel cylinder 5R. The third position is encountered when the current signal i2 has a level of five amperes and the pressure control valve 14F provides communication between the wheel cylinder 5R and the reservoir 19F so as to reduce the fluid pressure in the wheel cylinder 5R. The pump 20F runs when the pressure control valves 13F and 14F are in the second or third position.

Similarly, the second hydraulic system includes a pressure responsive change-over valve 8R which has an inlet connected through a conduit 7R to the master cylinder 4 and an outlet connected through a pilot cylinder 9R to a conduit 10R. The change-over valve 8R normally occupies in a first position, illustrated in FIG. 1, to provide communication between the master cylinder 4 and the pilot cylinder 9R. The change-over valve 8R responds to a fluid pressure by changing to a second position permitting fluid flow from the master cylinder 4 to the pilot cylinder 9R but not vice versa. The pilot cylinder 9R includes a piston 9c provided for reciprocating movement within the pilot cylinder valve bore to define output and input chambers 9a and 9b on the opposite sides of the piston 9c. The piston 9c is urged toward the illustrated first position by means of a compression spring 9d placed within the pilot cylinder valve bore. When the input chamber 9b receives a fluid pressure, the piston 9c moves against the resilient force of the compression spring 9d to force fluid from the output chamber 9a to the conduit 10R. The conduit 10R is divided into two conduits 11R and 12R, the first conduit 11R being connected through a pressure control valve 13R to the wheel cylinder 6L provided for the left rear wheel 2L. The second conduit 12R is connected through another pressure control valve 14R to the wheel cylinder 6R provided for the right rear wheel 2R. A pump 20R is provided to supply fluid from a reservoir 19R to the conduit 10R when it is running and an accumulator 21R is charged up the fluid flow through the conduit 10R. The pressure control valve 13R operates on a current signal i3 fed thereto to occupy one of three positions. The first position, illustrated in FIG. 1, is occupied when the current signal i3 has a level of zero amperes and the pressure control valve 13R provides communication of the conduit 11R with the wheel cylinder 6L provided for the left rear wheel 2L so as to increase the fluid pressure introduced to the wheel cylinder 6L. The second position is encountered when the current signal i3 has a level of two amperes and the pressure control valve 13R interrupts the communication between the conduit 11R and the wheel cylinder 6L so as to retain the fluid pressure in the wheel cylinder 6L. The third position is encountered when the current signal i3 has a level of five amperes and the pressure control valve 13R provides communication between the wheel cylinder 6L and the reservoir 19R so as to reduce the fluid pressure in the wheel cylinder 6L. The pressure control valve 14R operates on a current signal i4 fed thereto to occupy one of three positions. The first position, illustrated in FIG. 1, is occupied when the current signal i4 has a level of zero amperes and the pressure control valve 14R provides communication of the conduit 11R with the wheel cylinder 6R provided for the right rear wheel 2R so as to increase the fluid pressure introduced to the wheel cylinder 6R. The second position is encountered when the current signal i4 has a level of two amperes and the pressure control valve 14R interrupts the communication between the conduit 11R and the wheel cylinder 6R so as to retain the fluid pressure in the wheel cylinder 6R. The third position is encountered when the current signal i4 has a level of five amperes and the pressure control valve 14R provides communication between the wheel cylinder 6R and the reservoir 19R so as to reduce the fluid pressure in the wheel cylinder 6R. The pump 20R runs when the pressure control valves 13R and 14R are in the second or third position.

The pressure responsive change-over valves 8F and 8R and the pilot cylinders 9F and 9R are controlled by an automatic braking system including a solenoid change-over valve 18. The solenoid change-over valve 18 has three ports. The first port connected to the pressure responsive change-over valves 8F and 8R and also to the input chambers 9b of the respective pilot cylinders 9F and 9R. The second port is connected to a reservoir 16 from which a pump 15 supplies fluid to the third port of the solenoid change-over valve 18. An accumulator 17 is charged up the fluid flow to the third port of the solenoid change-over valve 18. The solenoid change-over valve 18 operates on a current signal i5 fed thereto to occupies one of two positions. The first position, illustrated in FIG. 1, is occupied when the current signal i5 has a level of zero amperes for the purpose of operating the braking system in a foot braking mode and the solenoid change-over valve 18 provides communication between its first and second ports. In the first position, thus, no fluid pressure is applied to the change-over valves 8F and 8R and the pilot cylinders 9F and 9R. Consequently, the fluid pressure discharged from the pilot cylinders 9F and 9R to the respective conduits 10F and 10R depends upon the degree of depression of the brake pedal 3. The second position is encountered when the current signal i5 has a level of two amperes for the purpose of operating the braking system in an automatic braking mode and the solenoid change-over valve 18 provides communication between its first and third ports. In the second position, thus, a constant fluid pressure is applied to change the change-over valves 8F and 8R to the second positions preventing back-flows from the pilot cylinders 9F and 9R to the master cylinder 4. The constant fluid pressure is also introduced into the input chambers 9b of the pilot cylinders 9F and 9R to force fluid from the output chambers 9a to the respective conduits 10F and 10R. Consequently, the fluid pressure discharged from the pilot cylinders 9F and 9R does not depend upon the degree of depression of the brake pedal 3 and it depends upon the fluid pressure from the accumulator 17.

The levels of the respective current signals i1, i2, i3, i4 and i5 are repetitively determined from calculations performed by an control unit 22, these calculations being made based upon various conditions of the automotive vehicle that are sensed during its operation. These sensed conditions include steering angle $\theta$, brake pedal depression, wheel speeds Vw1, Vw2, Vw3 and Vw4, vehicle lateral acceleration g, and lateral slip angle $\beta$. Thus, a steering angle sensor 23, a brake switch 24, wheel speed sensors 25, 26, 27 and 28, a lateral acceleration sensor 29 and a lateral slip angle sensor 30 are connected to the control unit 22.

Figure 2:
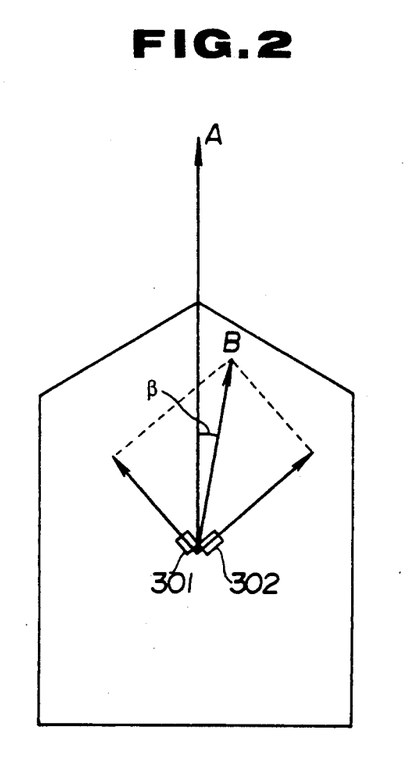
FIG. 2 is a schematic plan view showing one example of vehicle lateral slip angle sensor used in the vehicle turning behavior control apparatus of the invention.

The steering angle sensor 23 is provided to sense the degree $\theta$ of rotation of the steering wheel with respect to its neutral position and it produces an electric signal indicative of the sensed steering angle $\theta$. The steering angle indication signal has a sign indicating the direction to which the vehicle steering handle turns. The brake switch 24 is associated with the brake pedal 3 to close to supply current from the engine battery to the control unit 22 in response to the application of foot braking to the vehicle (when the brake pedal 3 is depressed). The wheel speed sensors 25, 26, 27 and 28 are provided to sense the peripheral speeds Vw1, Vw2, Vw3 and Vw4 of rotation of the respective wheels 1L, 1R, 2L and 2R and they produces electrical signals indicative of the sensed wheel speeds Vw1, Vw2, Vw3 and Vw4. The lateral acceleration sensor (lateral G sensor) 29 senses the vehicle lateral acceleration g and produces an electric signal indicative of the sensed lateral acceleration g. The lateral slip angle sensor 30 is provided to sense the magnitude of the angle $\beta$ (vehicle lateral slip angle) of the vehicle travel direction made with respect to the direction in which the vehicle is directed and it produces an electric signal indicative of the sensed lateral slip angle $\beta$. The lateral signal angle indication signal has a sign indicating the direction of the vehicle lateral slip angle. Preferably, the lateral slip angle sensor 30 is of the type employing two non-contact speed sensors (doppler sensors) 301 and 302 positions at 45 degrees with respect to the vehicle longitudinal axis, as shown in FIG. 2, where the character A indicates the direction in which the vehicle is directed and the character B indicates the direction of travel of the vehicle.

The numerals 31L, 31R, 32L and 32R designates fluid pressure sensors provided to sense the fluid pressures P1, P2, P3 and P4 introduced into the respective wheel cylinders 5L, 5R, 6L and 6R. The fluid pressure sensors produces electric signals indicative of the sensed fluid pressures P1, P2, P3 and P4 to the control unit 22. The control unit 22 employs these fluid pressure indication signals for providing feedback controls of the fluid pressures introduced into the respective wheel cylinders 5L, 5R, 6L and 6R.

The control unit 22 employs the signals from the wheel speed sensors 25, 26, 27 and 28 to provide anti-skid and traction controls. For a traction control, the control unit 22 outputs a control signal to an engine output controller.

When the brake pedal 3 is depressed, the control unit 22 receives a signal indicative of this condition from the brake switch 24 and sets the current signal i5 at zero amperes to hold the solenoid change-over valve 18 in the first (off) position, illustrated in FIG. 1. As a result, the change-over valves 8F and 8R and the pilot cylinders 9F and 9R are held in the illustrated positions. The control unit 23 sets the current signals i1 to i4 at zero amperes to hold the pressure control valves 13F, 14F, 13R and 14R in the positions, illustrated in FIG. 1, unless the wheels are locked by the brakes. Consequently, the fluid pressures supplied into the respective wheel cylinders 5L, 5R, 6L and 6R are substantially proportional to the force applied by the driver to the brake pedal 3.

The control unit 22 provides an anti-skid control. For this purpose, the control unit 22 employs the wheel speeds Vw1, Vw2, Vw3 and Vw4 to calculate a pseudo vehicle speed in a well-known manner. The control unit 22 employs the wheel speeds Vw1, Vw2, Vw3 and Vw4 to calculate braking slip factors for use in determining the brake lock conditions for the respective wheels. When there is a tendency toward a brake lock condition for one of the wheels, the control unit 22 sets the corresponding one of the current signals i1, i2, i3 and i4 at two amperes to change the corresponding pressure control valve to the second position retaining the fluid pressure in the corresponding wheel cylinder. If a brake lock condition occurs for the wheel, the control unit 22 sets the current signal at five amperes to change the corresponding control valve to the third position decreasing the fluid pressure in the corresponding wheel cylinder.

The control unit 22 provides a vehicle turning behavior control. For this purpose, the control unit 22 calculates a basic value $\Delta P1$ as a function of the vehicle steering angle $\theta$ to increase the basic value $\Delta P1$ as the vehicle steering angle $\theta$ increases, a correction factor K1 as a function of the vehicle lateral slip angle $\beta$ to decrease the correction factor K1 as the vehicle lateral slip angle $\beta$ increases, and a difference $\Delta P$ as $\Delta P = \Delta P1 \times K1$. The control unit 22 sets the pressure control valves 13F, 14F, 13R and 14R to provide the calculated difference $\Delta P$ between the braking forces applied to the nearside and offside wheels of the vehicle. The offside wheel is subject to a smaller braking force than the nearside wheel so as to produce a yaw moment in a direction to which the vehicle turns.

The control unit 22 employs a digital computer including a central processing unit (CPU), a random access memory (RAM), a read only memory (ROM), and an input/output control unit (I/O). The central processing unit communicates with the rest of the computer via data bus. The read only memory contains the program for operating the central processing unit and further contains appropriate data in look-up tables used in calculating appropriate values for the drive current signals i1 to i5.

Figure 3:
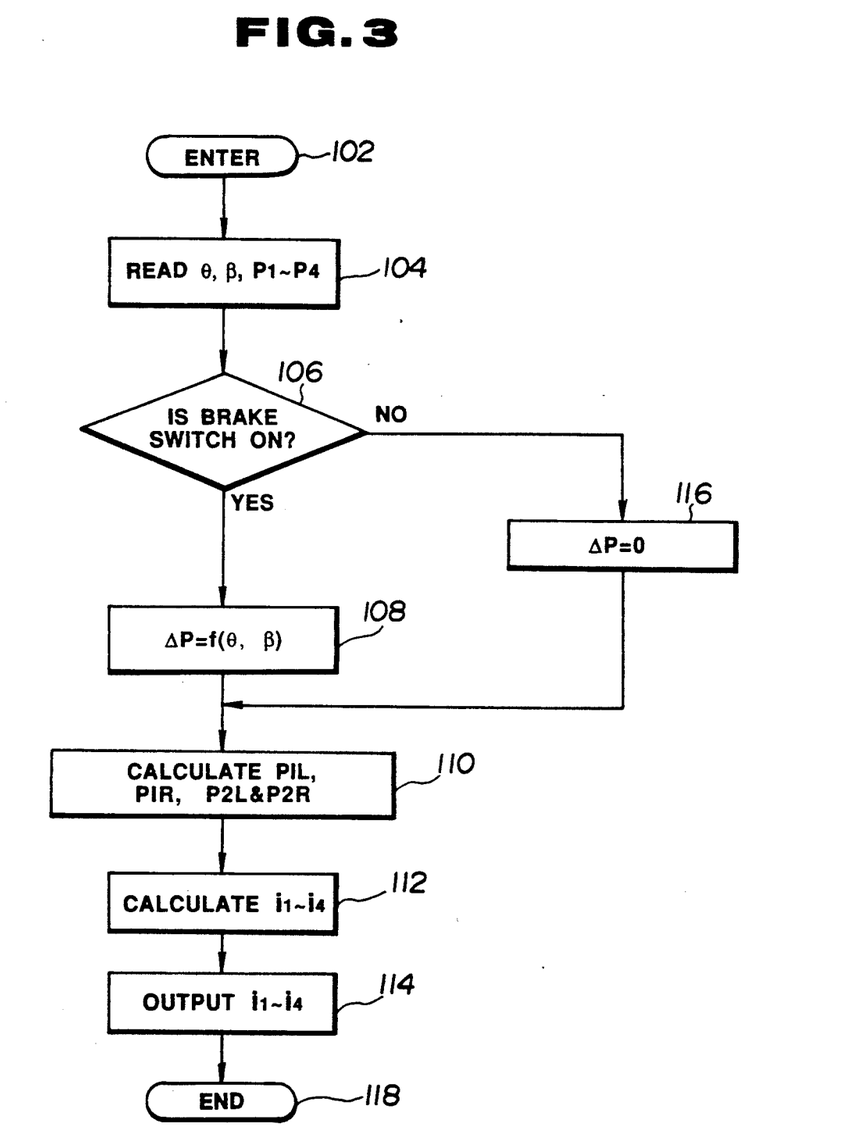
FIG. 3 is a flow diagram showing the programming of the digital computer used in the vehicle turning behavior control apparatus.

FIG. 3 is a flow diagram illustrating the programming of the digital computer. The computer program is entered at the point 102 at uniform intervals of time. At the point 104 in the program, the sensed steering angle $\theta$, the sensed vehicle lateral slip angle $\beta$ and the sensed fluid pressures P1, P2, P3 and P4 are read into the random access memory. At the point 106 in the program, a determination is made as to whether or not the brake switch 24 is turned on. This determination is made based upon the current signal fed from the brake switch 24. If the answer to this question is "yes", then it means that the driver depresses the brake pedal 3 and the program proceeds to the point 108 for providing a vehicle turning behavior control.

Figure 4:
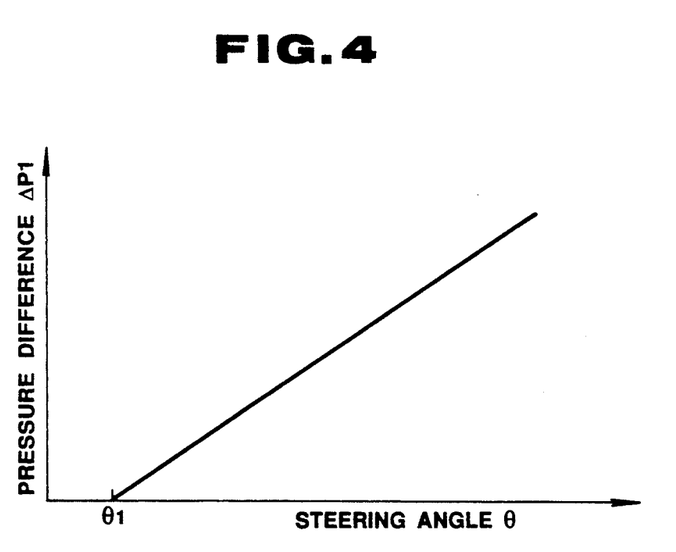
FIG. 4 is a graph of vehicle steering angle $\theta$ versus fluid pressure difference $\Delta P1$.
Figure 5:
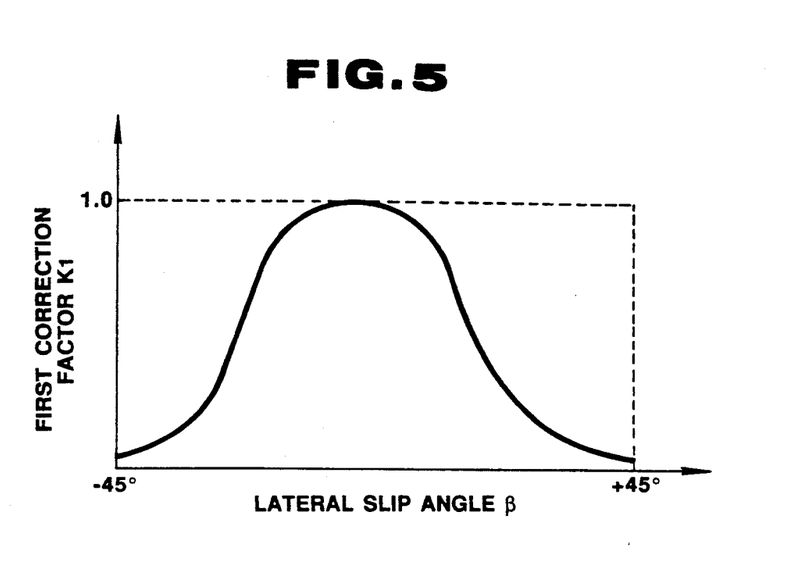
FIG. 5 is a graph of vehicle lateral slip angle $\beta$ versus first correction factor K1.

At the point 108 in the program, a fluid pressure difference value $\Delta P$ is calculated as a function of steering angle $\theta$ and lateral slip angle $\beta$. For this purpose, the central processing unit calculates a basic fluid pressure difference value $\Delta P1$ from a relationship programmed into the computer. This relationship specifies the basic fluid pressure difference value $\Delta P1$ as a function of steering angle $\theta$. One example of such a relationship is shown in FIG. 4 where the basic fluid pressure difference value $\Delta P1$ is zero when the steering angle $\theta$ is equal to or less than a predetermined value $\theta 1$ and it increases as the steering angle $\theta$ increases when the steering angle $\theta$ is greater than the predetermined value $\theta 1$. A correction factor K1 is used to modify the calculated basic fluid pressure difference value $\Delta P1$ so as to obtain the fluid pressure difference value $\Delta P$ as $\Delta P = K1 \times \Delta P1$. The correction factor K1 is calculated from a relationship programmed into the computer. This relationship defines the correction factor K1 as a function of lateral slip angle $\beta$. One example of such a relationship is shown in FIG. 5 where the correction factor K1 decreases as the absolute value of the lateral slip angle $\beta$ increases. The calculated fluid pressure difference value $\Delta P$ corresponds to a difference between the fluid pressures to be introduced into the wheel cylinders 5L and 5R provided for the respective front wheels 1L and 1R and also to the difference between the fluid pressures to be introduced into the wheel cylinders 6L and 6R provided for the respective rear wheels 2L and 2R.

At the point 110 in the program, target values P1L, P1R, P2L and P2R for the fluid pressures to be introduced into the wheel cylinders 5L, 5R, 6L and 6R provided for the respective wheels 1L, 1R, 2L and 2R are calculated. These target values are calculated in such a manner that a smaller braking force is applied to an outer or offside one of the front wheels positioned on the outside of a circle in which the vehicle moves than is applied to the other inner or nearside front wheel and a smaller braking force is applied to an outer or offside one of the rear wheels positioned on the outside of the circle than is applied to the other inner or nearside rear wheel. It is to be understood that the direction to which the cornering path is curved is determined based upon the sign of the signal from the steering angle sensor 23.

For example, when the vehicle is turning to the left, the right front wheel (offside wheel) 1R is subject to a smaller braking force than the left front wheel (nearside wheel) 1L and the right rear wheel (offside wheel) 2R is subject to a smaller braking force than the left rear wheel (nearside wheel) 2L. For this purpose, the central processing unit calculates a target value P1L for the fluid pressure to be introduced into the wheel cylinder 5L provided for the left front wheel 1L as P1L=P1 where P1 is the sensed fluid pressure introduced into the wheel cylinder 5L and a target value P1R for the fluid pressure to be introduced into the wheel cylinder 5R provided for the right front wheel 1R as P1R=P1−$\Delta P$. The central processing unit further calculates a target value P2L for the fluid pressure to be introduced into the wheel cylinder 6L provided for the left rear wheel 2L as P2L=P3 where P3 is the sensed fluid pressure introduced into the wheel cylinder 6L and a target value P2R for the fluid pressure to be introduced into the wheel cylinder 6R provided for the right rear wheel 2R as P2R=P3−$\Delta P$.

When the vehicle is turning to the right, the left front wheel 1L (offside wheel) is subject to a smaller braking force than the right front wheel (nearside wheel) 1R and the left rear wheel (offside wheel) 2L is subject to a smaller braking force than the right rear wheel (nearside wheel) 2R. For this purpose, the central processing unit calculates a a target value P1R for the fluid pressure to be introduced into the wheel cylinder 5R as P1R=P2 where P2 is the sensed fluid pressure introduced into the wheel cylinder 5R and a target value P1L for the fluid pressure to be introduced into the wheel cylinder 5L provided for the left front wheel 1L as P1L=P2−$\Delta P$. The central processing unit further calculates a target value P2R for the fluid pressure to be introduced into the wheel cylinder 6R as P2R=P4 where P4 is the sensed fluid pressure introduced into the wheel cylinder 6R and a target value P2L for the fluid pressure to be introduced into the wheel cylinder 6L provided for the left rear wheel 2L as P2L=P4−$\Delta P$.

At the point 114 in the program, the central processing unit calculates target values for the current signals i1, i2, i3 and i4 applied to the respective pressure control valves 13F, 14F, 13R and 14R. These calculations are made based upon the calculated target values P1L, P1R, P2L and P2R. At the point 116 in the program, the calculate target current signal values are transferred to the input/output control unit. The input/output control unit sets the current signals i1, i2, i3 and i4 to cause the pressure control valves 13F, 14F, 13R and 14R to control the fluid pressures to the wheel cylinders 5L, 5R, 6L and 6R to the calculated target values P1L, P1R, P2L and P2R, respectively. In the illustrated case, the input/output control unit maintains the current signals i1 and i3 as they stand and takes the current signals i2 and i4 in the form of on-off signals to reduce the fluid pressures P2 and P4 when the vehicle moves along a left-handed cornering path and it maintains the current signals i2 and i4 as they stand and takes the current signals i1 and i3 in the form of on-off signals to reduce the fluid pressures P1 and P3 when the vehicle moves along a right-handed cornering path. The input/output control unit employs the fluid pressure sensors to provide feedback controls of the fluid pressures P1, P2, P3 and P4. After the calculated values are transferred to the input/output control unit, the program proceeds to the end point 118.

If the answer to the question inputted at the point 106 is "no", then it means that the brake pedal 3 is released and the program proceeds to the point 116 where the target fluid pressure value ΔP is set at zero. Following this, the program proceeds to the point 110. In this case, the control unit 23 provide no vehicle turning behavior control when the brake pedal 3 is released.

Figure 6:
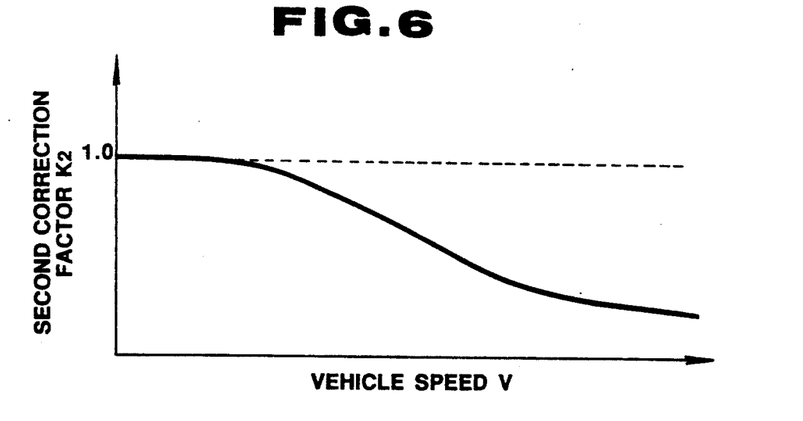
FIG. 6 is a graph of vehicle speed V versus second correction factor K2.

Although the fluid pressure difference value ΔP has been described as calculated as a function of steering angle $\theta$ and lateral slip angle $\beta$, it is to be understood that the fluid pressure difference value ΔP may be calculated as a function of steering angle $\theta$, lateral slip angle $\beta$ and vehicle speed V. In this case, the fluid pressure difference value ΔP is calculated as ΔP=K1×K2×ΔP1 where K2 is a correction factor calculated from a relationship which specifies the correction factor K2 as a function of vehicle speed V. One example of such a relationship is shown in FIG. 6 where the correction factor K2 decreases from 1.0 as the vehicle speed V increases. The vehicle speed V may be calculated based upon the speeds of the driven wheels of the vehicle.

When the brake pedal 3 is depressed to apply a braking force to each of the wheels of the vehicle turning either to the right or to the left, the braking forces applied to the offside wheels are smaller than those corresponding to the brake pedal force. As a result, the vehicle is subject to a yaw moment in the direction to which the vehicle is turning so as to promote the tendency of the vehicle to turn in the direction. If the braking force difference is determined as a function of steering angle, the vehicle will turn to an excessive extent at great lateral slip angles $\beta$. According to this embodiment, the difference between the braking forces applied to the offside and inside wheels is corrected for the lateral slip angle $\beta$ in such a manner that the braking force difference decreases as the lateral slip angle $\beta$ increases. As a result, the yaw moment decreases as the lateral slip angle $\beta$ increases.

Although the vehicle turning condition is detected based upon the vehicle steering angle $\theta$, it is to be understood that the yaw rate or the lateral acceleration g sensed by the lateral acceleration sensor 29 may be used singly or in combination with the vehicle steering angle $\theta$.

Figure 7:
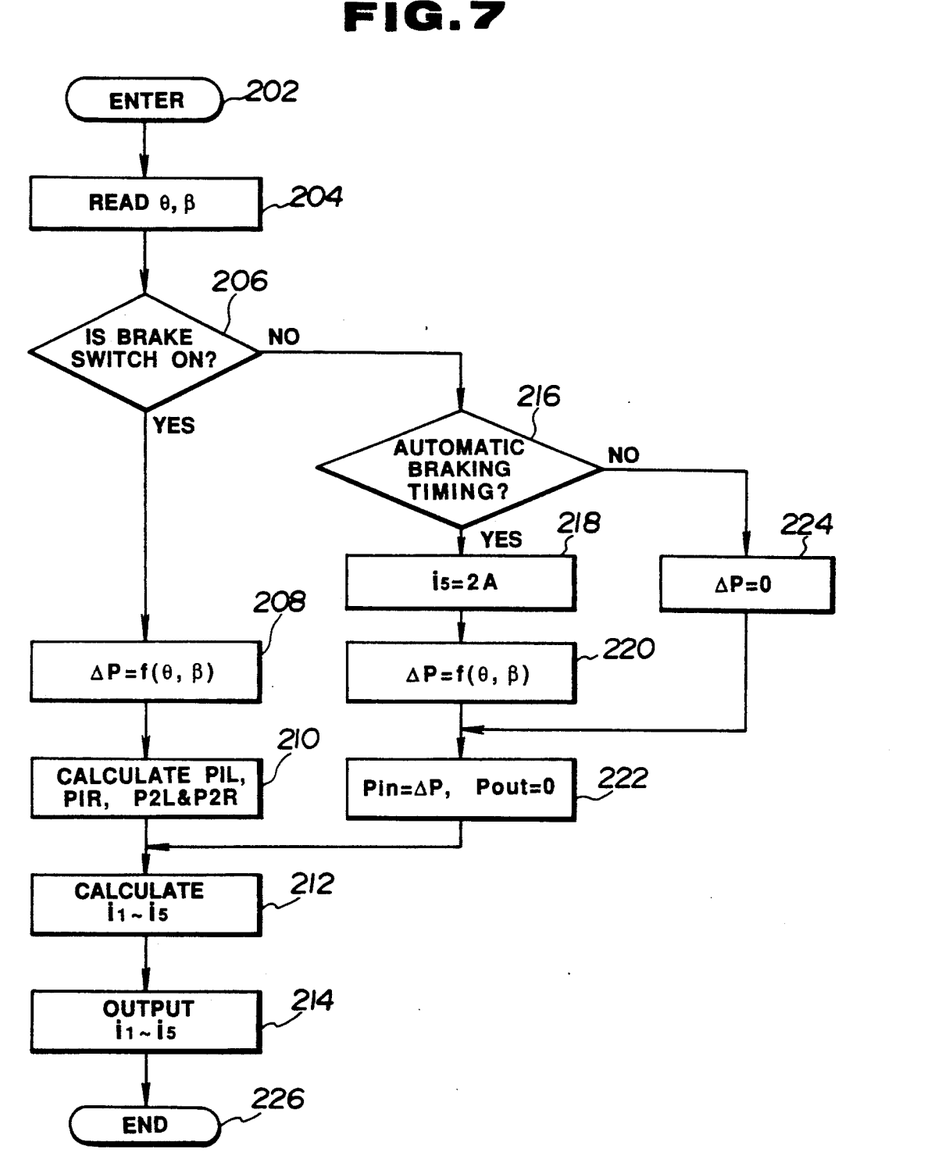
FIG. 7 is a flow diagram showing a modified form of the programming of the digital computer used in the vehicle turning behavior control apparatus.

FIG. 7 is a flow diagram illustrating a modified form of the programming of the digital computer. The computer program is entered at the point 202 at uniform intervals of time. At the point 204 in the program, the sensed steering angle $\theta$, the sensed vehicle lateral slip angle $\beta$ and the sensed fluid pressures P1, P2, P3 and P4 are read into the random access memory. At the point 206 in the program, a determination is made as to whether or not the brake switch 24 is turned on. This determination is made based upon the current signal fed from the brake switch 24. If the answer to this question is "yes", then it means that the driver depresses the brake pedal 3 and the program proceeds to the point 208 for providing a vehicle turning behavior control.

At the point 208 in the program, a fluid pressure difference value ΔP is calculated as a function of steering angle $\theta$ and lateral slip angle $\beta$. For this purpose, the central processing unit calculates a basic fluid pressure difference value ΔP1 from a relationship programmed into the computer. This relationship specifies the basic fluid pressure difference value ΔP1 as a function of steering angle $\theta$. One example of such a relationship is shown in FIG. 4 where the basic fluid pressure difference value ΔP1 is zero when the steering angle $\theta$ is equal to or less than a predetermined value $\theta 1$ and it increases as the steering angle $\theta$ increases when the steering angle $\theta$ is greater than the predetermined value $\theta 1$. A correction factor K1 is used to modify the calculated basic fluid pressure difference value ΔP1 so as to obtain the fluid pressure difference value ΔP as ΔP=K1×ΔP1. The correction factor K1 is calculated from a relationship programmed into the computer. This relationship defines the correction factor K1 as a function of lateral slip angle $\beta$. One example of such a relationship is shown in FIG. 5 where the correction factor K1 decreases as the absolute value of the lateral slip angle $\beta$ increases. The calculated fluid pressure difference value ΔP corresponds to a difference between the fluid pressures to be introduced into the wheel cylinders 5L and 5R provided for the respective front wheels 1L and 1R and also to the difference between the fluid pressures to be introduced into the wheel cylinders 6L and 6R provided for the respective rear wheels 2L and 2R.

At the point 210 in the program, target values P1L, P1R, P2L and P2R for the fluid pressures to be introduced into the wheel cylinders 5L, 5R, 6L and 6R provided for the respective wheels 1L, 1R, 2L and 2R are calculated. These target values are calculated in such a manner that a smaller braking force is applied to an outer or offside one of the front wheels positioned on the outside of a circle in which the vehicle moves than is applied to the other inner or nearside front wheel and a smaller braking force is applied to an outer or offside one of the rear wheels positioned on the outside of the circle than is applied to the other inner or nearside rear wheel. It is to be understood that the direction to which the cornering path is curved is determined based upon the sign of the signal from the steering angle sensor 23.

For example, when the vehicle is turning to the left, the right front wheel (offside wheel) 1R is subject to a smaller braking force than the left front wheel (nearside wheel) 1L and the right rear wheel (offside wheel) 2R is subject to a smaller braking force than the left rear wheel (nearside wheel) 2L. For this purpose, the central processing unit calculates a target value P1L for the fluid pressure to be introduced into the wheel cylinder 5L provided for the left front wheel 1L as P1L=P1 where P1 is the sensed fluid pressure introduced into the wheel cylinder 5L and a target value P1R for the fluid pressure to be introduced into the wheel cylinder 5R provided for the right front wheel 1R as P1R=P1−ΔP. The central processing unit further calculates a target value P2L for the fluid pressure to be introduced into the wheel cylinder 6L provided for the left rear wheel 2L as P2L=P3 where P3 is the sensed fluid pressure introduced into the wheel cylinder 6L and a target value P2R for the fluid pressure to be introduced into the wheel cylinder 6R provided for the right rear wheel 2R as P2R=P3−ΔP.

When the vehicle is turning to the right, the left front wheel 1L (offside wheel) is subject to a smaller braking force than the right front wheel (nearside wheel) 1R and the left rear wheel (offside wheel) 2L is subject to a smaller braking force than the right rear wheel (nearside wheel) 2R. For this purpose, the central processing unit calculates a a target value P1R for the fluid pressure to be introduced into the wheel cylinder 5R as P1R=P2 where P2 is the sensed fluid pressure introduced into the wheel cylinder 5R and a target value P1L for the fluid pressure to be introduced into the wheel cylinder 5L provided for the left front wheel 1L as P1L=P2−ΔP. The central processing unit further calculates a target value P2R for the fluid pressure to be introduced into the wheel cylinder 6R as P2R=P4 where P4 is the sensed fluid pressure introduced into the wheel cylinder 6R and a target value P2L for the fluid pressure to be introduced into the wheel cylinder 6L provided for the left rear wheel 2L as P2L=P4−ΔP.

At the point 212 in the program, the central processing unit calculates target values for the current signals i1, i2, i3 and i4 applied to the respective pressure control valves 13F, 14F, 13R and 14R. These calculations are made based upon the calculated target values P1L, P1R, P2L and P2R. The central processing unit also a target value for the current signal i5 applied to the solenoid change-over valve 18. At the point 214 in the program, the calculate target current signal values are transferred to the input/output control unit. The input/output control unit sets the current signals i1, i2, i3 and i4 to cause the pressure control valves 13F, 14F, 13R and 14R to control the fluid pressures to the wheel cylinders 5L, 5R, 6L and 6R to the calculated target values P1L, P1R, P2L and P2R, respectively. In the illustrated case, the input/output control unit maintains the current signals i1 and i3 as they stand and takes the current signals i2 and i4 in the form of on-off signals to reduce the fluid pressures P2 and P4 when the vehicle moves along a left-handed cornering path and it maintains the current signals i2 and i4 as they stand and takes the current signals i1 and i3 in the form of on-off signals to reduce the fluid pressures P1 and P3 when the vehicle moves along a right-handed cornering path. The input/output control unit employs the fluid pressure sensors to provide feedback controls of the fluid pressures P1, P2, P3 and P4. The input/output control unit produces a current signal i5 having a set level to the solenoid change-over valve 18. After the calculated values are transferred to the input/output control unit, the program proceeds to the end point 226.

If the answer to the question inputted at the point 206 is "no", then it means that the brake pedal 3 is released and the program proceeds to another determination step at the point 216. This determination is as to whether or not it is a time at which the automatic braking mode is required. If the answer to this question is "yes", then it means that the vehicle is in a predetermined turning condition and the program proceeds to the point 218 where the current signal i5 is set at two amperes in order to energize the solenoid change-over valve 18 so as to place the braking system in an automatic braking mode.

At the point 220 in the program, a fluid pressure difference value ΔP is calculated as a function of steering angle $\theta$ and lateral slip angle $\beta$. For this purpose, the central processing unit calculates a basic fluid pressure difference value ΔP1 from a relationship programmed into the computer. This relationship specifies the basic fluid pressure difference value ΔP1 as a function of steering angle $\theta$. One example of such a relationship is shown in FIG. 4 where the basic fluid pressure difference value ΔP1 is zero when the steering angle $\theta$ is equal to or less than a predetermined value $\theta1$ and it increases as the steering angle $\theta$ increases when the steering angle $\theta$ is greater than the predetermined value $\theta1$. A correction factor K1 is used to modify the calculated basic fluid pressure difference value ΔP1 so as to obtain the fluid pressure difference value ΔP as ΔP=K1×ΔP1. The correction factor K1 is calculated from a relationship programmed into the computer. This relationship defines the correction factor K1 as a function of lateral slip angle $\beta$. One example of such a relationship is shown in FIG. 5 where the correction factor K1 decreases as the absolute value of the lateral slip angle $\beta$ increases. The calculated fluid pressure difference value ΔP corresponds to a difference between the fluid pressures to be introduced into the wheel cylinders 5L and 5R provided for the respective front wheels 1L and 1R and also to the difference between the fluid pressures to be introduced into the wheel cylinders 6L and 6R provided for the respective rear wheels 2L and 2R.

At the point 222 in the program, target values P1L, P1R, P2L and P2R for the fluid pressures to be introduced into the wheel cylinders 5L, 5R, 6L and 6R provided for the respective wheels 1L, 1R, 2L and 2R are calculated. These target values are calculated in such a manner that the fluid pressures (Pout) to be introduced into the wheel cylinders provided for the outer or offset wheels positioned on the outside of a circle in which the vehicle moves are set at zero and the fluid pressures (Pin) to be introduced into the wheel cylinders provided for the inner or nearside wheels positioned on the inside of the circle are set at the calculated fluid pressure difference ΔP.

For example, when the vehicle is turning to the left, the central processing unit sets zero for a target value P1R for the fluid pressure to be introduced into the wheel cylinder 5R provided for the right front wheel 1R and ΔP for a target value P1L for the fluid pressure to be introduced into the wheel cylinder 5L provided for the left front wheel 1L. The central processing unit further sets zero for a target value P2R for the fluid pressure to be introduced into the wheel cylinder 6R provided for the right rear wheel 2R and ΔP for a target value P2L for the fluid pressure to be introduced into the wheel cylinder 6L provided for the left rear wheel 2L.

When the vehicle is turning to the right, the central processing unit sets zero for a target value P1L for the fluid pressure to be introduced into the wheel cylinder 5L provided for the left front wheel 1L and ΔP for a target value P1R for the fluid pressure to be introduced into the wheel cylinder 5R provided for the right front wheel 1R. The central processing unit further sets zero for a target value P2L for the fluid pressure to be introduced into the wheel cylinder 6L provided for the left rear wheel 2L and ΔP for a target value P2R for the fluid pressure to be introduced into the wheel cylinder 6R provided for the right rear wheel 2R. Following this, the program proceeds to the point 212.

If the answer to the question inputted at the point 216 is "no", then the program proceeds to the point 224 where the fluid pressure difference ΔP is set at zero. Following this, the program proceeds to the point 222. In this case, neither vehicle turning behavior control nor no automatic braking operation is performed.

Although the fluid pressure difference value ΔP has been described as calculated as a function of steering angle $\theta$ and lateral slip angle $\beta$, it is to be understood that the fluid pressure difference value ΔP may be calculated as a function of steering angle $\theta$, lateral slip angle $\beta$ and vehicle speed V. In this case, the fluid pressure difference value ΔP is calculated as ΔP=K1×K2×ΔP1 where K2 is a correction factor calculated from a relationship which specifies the correction factor K2 as a function of vehicle speed V. One example of such a relationship is shown in FIG. 6 where the correction factor K2 decreases from 1.0 as the vehicle speed V increases. The vehicle speed V may be calculated based upon the speeds of the driven wheels of the vehicle.

In this modification, the vehicle turning behavior control is made during an automatic braking mode when the vehicle is turning either to the left or to the right. The difference between the braking forces applied to the offside and inside wheels is corrected for the lateral slip angle β in a direction to decreases the yaw moment as the lateral slip angle β increases.

Although the vehicle turning condition is detected based upon the steering angle θ, it is to be understood that the yaw rate or the lateral accelertion g sensed by the lateral acceleration sensor 29 may be used singly or in combination with the steering angle θ.

Although the invention has been described in connection with a vehicle turning behavior control apparatus arranged to provide a difference between the braking forces applied to the respective front wheels and between the braking forces applied to the respective rear wheels, it is to be understood that the vehicle turning behavior control apparatus may be arranged to provide a difference between the braking forces applied to the respective front wheels or between the braking forces applied to the rear wheels.

In addition, the fluid pressure difference ΔP may be obtained as a function of time. In this case, the fluid pressure difference ΔP gradually decreases to zero as time progresses after the fluid pressure difference ΔP is calculated once.

Although the fluid pressure sensors 31L, 31R, 32L and 32R are used to provide feedback control of the fluid pressures to the respective wheel cylinders 5L, 5R, 6L and 6R, it is to be understood that the vehicle turning behavior control apparatus may be arranged to provide an open loop control for these fluid pressures. In this case, the fluid pressure sensors may be removed.

What is claimed is:

1. An apparatus for controlling turning behavior of a multi-wheeled automotive vehicle supported on a plurality of pairs of wheels, the apparatus comprising:
   braking means for applying braking forces to the respective wheels;
   first sensor means sensitive to a vehicle steering condition for producing a first signal indicative of a sensed vehicle steering condition;
   second sensor means sensitive to a vehicle lateral slip angle for producing a second signal indicative of a sensed vehicle lateral slip angle; and
   a control unit coupled to the first and second sensor means, the control unit including means for providing a difference between the braking forces applied to nearside and offside wheels of at least one of the pairs of wheels based upon the sensed vehicle steering condition to produce a yaw moment in a direction to which the vehicle turns, and means for modifying the difference based upon the sensed vehicle lateral slip angle to decrease the difference as the vehicle lateral slip angle increases.

2. The apparatus as claimed in claim 1, wherein the first sensor means is sensitive to a vehicle steering angle for producing the first signal indicative of a sensed vehicle steering angle, and wherein the control unit includes means for increasing the difference as the sensed vehicle steering angle increases when the sensed vehicle steering angle exceeds a predetermined value.

3. The apparatus as claimed in claim 2, further comprising third sensor means associated with a brake pedal of the vehicle for producing a third signal when the brake pedal is depressed, and wherein the control unit includes means responsive to the third signal for controlling the braking force applied to the nearside wheel to a first value corresponding to an amount the brake pedal is depressed and the braking force applied to the offside wheel to a second value equal to the first value minus the modified difference.

4. The apparatus as claimed in claim 3, wherein the braking means includes automatic braking means operable for applying predetermined braking forces to the respective wheels when the sensed steering angle exceeds a predetermined value, and wherein the control unit includes means operable, when the automatic braking means is operating, for controlling the braking force applied to the offside wheel to zero and the braking force applied to the nearside wheel to a value equal to the modified difference.

5. An apparatus for controlling turning behavior of a multi-wheeled automotive vehicle supported on a plurality of pairs of wheels, the apparatus comprising:
   braking means for applying braking forces to the respective wheels;
   first sensor means sensitive to a vehicle steering angle for producing a first signal indicative of a sensed vehicle steering angle;
   second sensor means sensitive to a vehicle lateral slip angle for producing a second signal indicative of a sensed vehicle lateral slip angle; and
   a control unit coupled to the first and second sensor means, the control unit including means for calculating a basic value ΔP1 as a function of the sensed vehicle steering angle to increase the basic value as the sensed vehicle steering angle increases when the sensed vehicle steering angle exceeds a predetermined value, means for calculating a first correction factor K1 as a function of the sensed vehicle lateral slip angle to decrease the first correction factor as the sensed vehicle laterial slip increases, means for calculating a difference ΔP as ΔP=ΔP1×K1, and means for setting the braking means to provide the calculated difference ΔP between the braking forces applied to nearside and offside wheels of at least one of the pairs of wheels so that the braking force applied to the offside wheel is smaller than the braking force applied to the nearside wheel.

6. The apparatus as claimed in claim 5, wherein the control unit includes means for calculating a second correction factor K2 as a function of vehicle speed to decrease the second correction factor as the vehicle speed increases, and means for calculating the difference ΔP as ΔP=ΔP1×K1×K2.

7. The apparatus as claimed in claim 5, further comprising third sensor means associated with a brake pedal of the vehicle for producing a third signal when the brake pedal is depressed, and wherein the control unit includes means responsive to the third signal for causing the braking means to set the braking force applied to the nearside wheel at a first value corresponding to an amount the brake pedal is depressed and the braking force applied to the offside wheel at a second value equal to the first value minus the calculated difference.

8. The apparatus as claimed in claim 7, wherein the braking means includes automatic braking means operable for applying constant braking forces to the respective wheels when the sensed vehicle steering angle exceeds a predetermined value, and wherein the control unit includes means operable, when the automatic braking means is operating, for causing the braking means to set the braking force applied to the offside wheel to zero and the braking force applied to the nearside wheel at a value equal to the calculated difference.

* * * * *